United States Patent
Cheng

(10) Patent No.: US 6,749,081 B2
(45) Date of Patent: Jun. 15, 2004

(54) METHOD OF SURFACE TREATING A COOKWARE ARTICLE AND AN ARTICLE SO TREATED

(75) Inventor: Stanley Kin-Sui Cheng, Kowloon (HK)

(73) Assignee: Meyer Manufacturing Company Limited, Kowloon (HK)

( * ) Notice: Subject to any disclaimer, the term of this patent is extended or adjusted under 35 U.S.C. 154(b) by 0 days.

(21) Appl. No.: 09/759,870

(22) Filed: Jan. 12, 2001

(65) Prior Publication Data

US 2002/0094424 A1 Jul. 18, 2002

(51) Int. Cl.7 .......................... A47J 27/00; A47J 29/00; C23C 28/00; C25D 5/50
(52) U.S. Cl. ................. 220/573.1; 220/573.2; 220/912; 205/190; 205/201; 205/224
(58) Field of Search ................. 205/149, 190, 205/201, 224; 428/212; 220/573.1, 573.2, 912

(56) References Cited

U.S. PATENT DOCUMENTS

| 5,411,014 A | * | 5/1995 | Paul | 126/390 |
| 5,628,426 A | * | 5/1997 | Doyle et al. | 220/608 |
| 5,989,631 A | * | 11/1999 | Dorfschmidt | 427/239 |

FOREIGN PATENT DOCUMENTS

| EP | 0424072 | 4/1991 |
| GB | 2265543 | 10/1993 |

OTHER PUBLICATIONS

Meyer Aluminum Limited, C. 2000 (no data available), pp. 1–2.*

* cited by examiner

*Primary Examiner*—Edna Wong
(74) *Attorney, Agent, or Firm*—Wood, Herron & Evans, L.L.P.

(57) ABSTRACT

A method of surface treating a cookware article formed of aluminum or aluminum alloy, comprises the steps of applying a first coating of porcelain enamel to the exterior of the article; subjecting the interior of the article to hard-anodizing; and applying a second coating of porcelain enamel over the first coating.

15 Claims, No Drawings

METHOD OF SURFACE TREATING A COOKWARE ARTICLE AND AN ARTICLE SO TREATED

BACKGROUND OF THE INVENTION

The present invention relates to a method of treating and coating an article of cookware formed at least in part of aluminum or aluminum alloy, and to an article so coated.

Traditional non-stick cookware in particular is often made of aluminum or aluminum alloy. Although cheap and easy to form into the desired shape the material is soft, porous and stains easily. Conventionally, the aluminum surface is covered with the combination of a non-stick coating on the cooking surface and a porcelain enamel or silicon-polyester paint on the exterior. Besides providing a decorative appearance and non-stick convenience, these coverings prevent the food from interacting with the aluminum surface, which can change the taste and colour of food. Since the non-stick interior is soft and will wear out, and the pan has a limited life.

In the case of aluminum cookware, since aluminum is such a soft material it is known and increasingly popular to subject the surface of such an article to an anodizing or hard-anodizing process. In such a process, the aluminum surface functions as an anode in an electrolytic bath so that the surface becomes exposed to and reacts with the very active oxygen which is released at the anode to form an aluminum oxide layer. Hard-anodizing requires the bath temperature to be lowered. Such an anodizing or hard-anodizing process results in a much harder surface which is less susceptible to scratching or to other damage. The applicant's EP 0424072A describes a technique for hard-anodizing, and the contents thereof are incorporated herein by reference.

Although the hard-anodizing technique greatly hardens the surface such that it becomes almost twice as hard as stainless steel, and this prevents interaction of the aluminum with foods, a problem is that the hard-anodized surface is very coarse and hard, such that it can easily abrade other surfaces such as worktops, stovetops, shelves, kitchen utensils etc which it comes into contact with and the surface quickly appears marked or marred. In addition, foods can penetrate into the hard porous surface easily staining it.

A further problem is that the hard-anodized surface cannot safely be subjected to washing in a dishwasher as the high water temperature and harsh alkaline detergents adversely affect the hard-anodized surface.

Although it would be desirable to be able to simply coat the hard-anodized surface with enamel, adherence with the porous aluminum oxide surface is very poor.

The present invention seeks to overcome these drawbacks.

SUMMARY OF THE INVENTION

According to a first aspect, the invention resides in a method of surface treating a cookware article formed of aluminum or aluminum alloy, comprising the steps of: a) applying a first coating of porcelain enamel to the exterior of the article; b) subjecting the interior of the article to hard-anodizing; and c) applying a second coating of porcelain enamel over the first coating.

The method results in an article of cookware which has a high quality, high gloss porcelain enamel-coated outer surface, and a hard-anodized interior which can if desired coated with a non-stick material.

The application of the porcelain enamel in two steps is found to be necessary since although not immediately apparent, the invention has found through testing that the anodizing acid attacks and corrodes the porcelain surface during hard-anodizing. When the pan is subjected to application of a non-stick coating and specifically the baking procedure to the non-stick coating, the porcelain surface exhibits greatly reduced the surface gloss. This problem is overcome by the two-step application procedure.

The porcelain enamel may be applied as a porcelain slip which is cured at an elevated temperature, preferably at a temperature which is sufficient to at least partially remelt the surface of the first porcelain enamel coating. This results in an enamel coating in which the second enamel coating is intimately bonded to the first enamel coating to form one single composite coat.

The first porcelain enamel coating is applied as a layer of thickness in the range 25 to 35 microns, whilst the second porcelain enamel coating is applied as a layer of thickness in the range 30 to 35 microns. The curing temperature of first and second porcelain coatings is in the region of 540° C. to 555° C., and the time of curing in the range 1 to 1½ minutes.

The anodizing time is preferably minimised, to about 20 minutes or less.

In a further aspect the invention resides in a method of forming an article of cookware of aluminum or aluminum alloy, comprising the steps of: i) providing a disc-like blank of flat metal; ii) forming the article by stamping into the desired shape; iii) applying a first coating of porcelain slip to the exterior of the article of thickness in the range 25 to 35 microns and curing at an elevated temperature to produce a hard enamel; iv) subjecting the interior surface to hard-anodizing; v) applying a second coating of porcelain slip of thickness in the range of 30 to 35 microns over the first coating and curing to produce a hard enamel; and vi) applying a non-stick coating to the hard-anodized interior surface of the article.

The invention also resides in an article of cookware when formed according to the methods described above.

In a still further aspect the invention resides in an article of cookware of aluminum or aluminum alloy having an exterior coating of porcelain enamel, and an interior hard-anodized surface covered in a non-stick coating. The total thickness of the porcelain enamel is in the range 60 to 70 microns.

An article of cookware so coated can be safely placed in a dishwasher without risk of damage.

DETAILED DESCRIPTION OF THE PREFERRED EMBODIMENTS

Embodiments of the present invention are now described, by way of example only, with reference to the following detailed description.

Starting with a flat circular blank of aluminum or an aluminum alloy the blank is stamp-marked to emboss a logo or other decorative marking and stamped to create a spiral-grooved pattern on the region which will form the pan base. These steps can be done simultaneously in a single press, or sequentially in separate presses.

The flat disc is then stamped into the desired shape of the cookware article in a screw press or similar in which the side wall of the article is drawn through a die upwardly relative to the base.

Instead of subjecting the formed article to hard-anodizing directly after forming the article is first coated with a porcelain enamel. Prior to coating it is subjected to a cleansing etch by a chemical or electrochemical etching process, as is conventional in the art. A porcelain enamel is then applied to the pan body exterior wall and base. The enamel composition is conventional in comprising a frit, colour pigments, mill addition and water mixed and ground in a ballmill for a continuous period of typically 12–14 hours. The porcelain enamel is applied as a mixture of specific viscosity of 23–25 seconds as measured by Ford cup #3 in a thickness of about 25–35 microns, more preferably 30–35 microns, and cured in a conveyor furnace. In the conveyor the article is passed through a preheat zone, a firing zone, a holding zone, and finally a cooling zone, taking typically 20 minutes to traverse the furnace. The curing starts in the firing zone, with final curing in the holding zone. A curing metal temperature of 540–555° C. is utilised with a curing time of 1 to 1.5 minutes.

The exterior coated article is then subjected to the hard-anodizing process. Firstly, the interior surface is gritblasted to create a roughened surface and immersed in a hot (65–70° C.) neutral, non-etching cleaning solution, followed by two water rinses. The anodizing solution is an acid, typically sulphuric acid at a concentration of 120 to 180 g of free acid (per liter, more preferably 150 g per liter. The acid solution is kept at a temperature in the range of 0 to −5° C, with a short anodizing time of about 20 minutes, although if the thickness of the first porcelain coat is towards the upper end of the range and with appropriate control of acid concentration a greater time of up to 40 minutes can be tolerated. The anodized film which forms should be typically in the range of 25–30 microns thick. The anodized article is rinsed in tap water, followed by deionized water and then blown dry.

A second porcelain coat is then applied to the exterior of the article. The same porcelain composition and viscosity are used, again in the thickness range 25–35 microns or more preferably 30–35 microns. Prior to curing, the pan can be silkscreened with any required patterns. The newly coated article is passed through a heated tunnel which includes heating means such as an LPG torch or infra-red heating to effect a rapid surface drying which creates a dry outer coat or crust. The pan base can then be subjected to the silkscreen printing. The article is then passed to the furnace conveyor for curing, at a temperature sufficient to remelt at least the surface of the first coat whereby the first and second coats bond intimately. Again a metal temperature of 540–555° C. and curing time of 1 to 1.5 minutes is found to be sufficient.

The exterior-coated shell is then coated on its interior with a non-stick material. A variety of non-stick coatings can be applied as is conventional, generally requiring application of primer coat and a polytetrafluoroethylene (PTFE) intermediate coat and PTFE top coat.

The resulting cookware article has an exterior of high quality and high gloss porcelain enamel, whilst the interior has a non-stick coated hard-anodized surface, whereby the article enjoys the benefits of both coatings.

What is claimed is:

1. A method of surface treating a cookware article formed of aluminum or aluminum alloy, comprising:
    a) applying a first coating of porcelain enamel to the exterior of the article;
    b) exposing the interior and the exterior of the article to an anodizing acid solution to subject the interior of the article to hard-anodizing after the first coating is applied; and
    c) applying a second coating of porcelain enamel over the first porcelain enamel coating after the interior of the article is hard-anodized.
2. A method according to claim 1 wherein the first and second porcelain enamel coatings are each applied as a porcelain slip which is cured at an elevated temperature.
3. A method according to claim 2 wherein the second porcelain enamel coating is subjected to curing at a temperature which is sufficient to at least partially remelt the surface of the first porcelain enamel coating.
4. A method according to claim 1 wherein the first porcelain enamel coating is applied as a layer of thickness in the range of 25 to 35 microns.
5. A method according to claim 1 wherein the second porcelain enamel coating is applied as a layer of thickness in the range of 30 to 35 microns.
6. A method according to claim 1 wherein the second porcelain enamel coating is subjected to rapid drying using infra-red heating means to dry the enamel surface, followed by silkscreen printing of a pattern onto the dried surface.
7. A method according to claim 1 wherein the first porcelain enamel coating is heated to curing at a temperature in the region of 540 to 555° C.
8. A method according to claim 7 wherein said curing is carried out for 1 to 1.5 minutes.
9. A method according to claim 1 wherein at step b) the interior of the article is subjected to anodizing for less than 20 minutes.
10. A method according to claim 1 wherein the hard-anodized interior of the article is coated with a non-stick coating.
11. The method of claim 1 wherein exposing the interior and exterior of the article to the anodizing acid solution further comprises:
    partially removing the first coating from the exterior.
12. An article of cookware when formed according to the method of claim 1.
13. A method of forming an article of cookware of aluminum or aluminum alloy, comprising:
    i) providing a blank of flat metal;
    ii) forming the article by stamping the blank into the desired shape;
    iii) applying a first coating of porcelain slip to the exterior of the article of thickness in the range of 25 to 35 microns and curing at an elevated temperature to produce a hard enamel;
    iv) exposing the interior and the exterior of the article to an anodizing acid solution to subject the interior to hard-anodizing after the first coating is applied and cured;
    v) applying a second coating of porcelain slip of thickness in the range of 30 to 35 microns over the first coating, after the interior is hard anodized, and curing to produce a hard enamel; and
    vi) applying a non-stick coating to the hard-anodized interior of the article.
14. The method of claim 13 wherein exposing the interior and exterior of the article to the anodizing acid solution further comprises:
    partially removing the first coating from the exterior.
15. An article of cookware when formed according to the method of claim 13.

* * * * *